No. 720,967. PATENTED FEB. 17, 1903.
E. RAWSON.
DRIVING GEAR FOR AUTOMOBILES.
APPLICATION FILED AUG. 1, 1902.
NO MODEL. 2 SHEETS—SHEET 1.

WITNESSES:

INVENTOR
Edward Rawson
BY
ATTORNEYS.

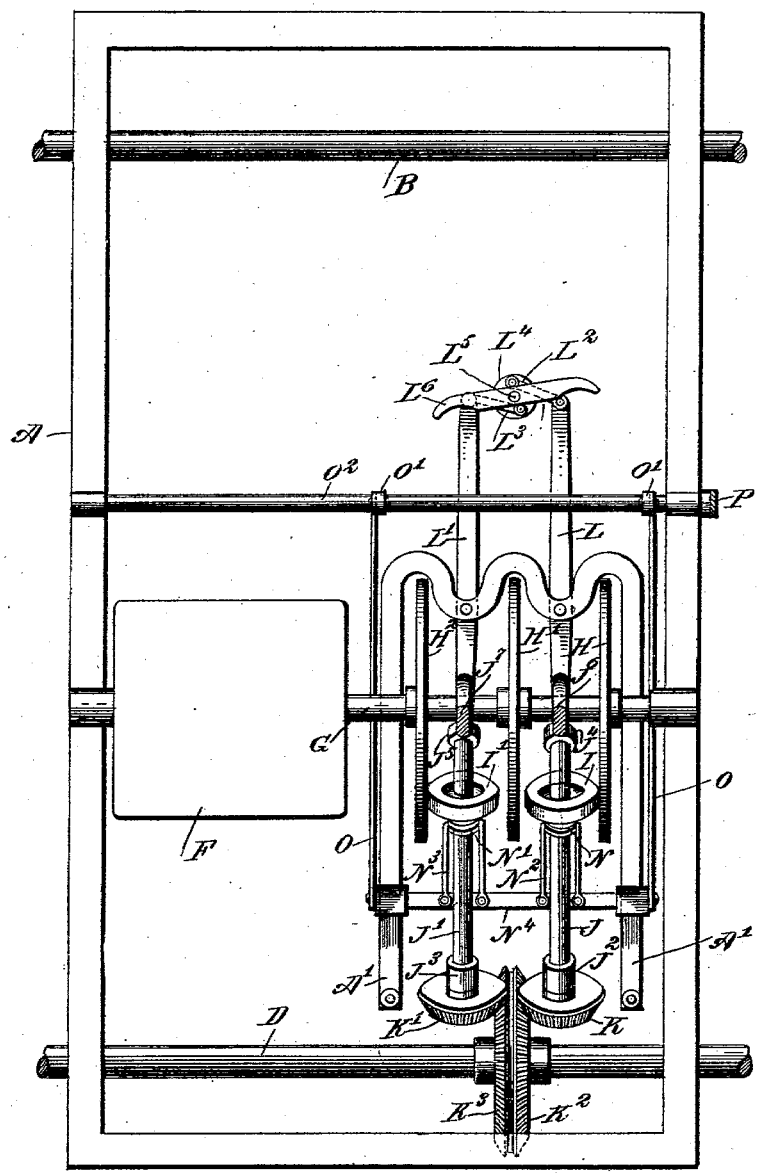

UNITED STATES PATENT OFFICE.

EDWARD RAWSON, OF MOSCOW, IDAHO.

DRIVING-GEAR FOR AUTOMOBILES.

SPECIFICATION forming part of Letters Patent No. 720,967, dated February 17, 1903.

Application filed August 1, 1902. Serial No. 117,946. (No model.)

*To all whom it may concern:*

Be it known that I, EDWARD RAWSON, a citizen of the United States, and a resident of Moscow, in the county of Latah and State of Idaho, have invented a new and Improved Driving-Gear for Automobiles, of which the following is a full, clear, and exact description.

The object of the invention is to provide a new and improved driving-gear for automobiles which is simple and durable in construction, very effective in operation, easily manipulated, and arranged to allow the chauffeur to readily throw the driving-gear in or out of action, to change the speed of the vehicle, and reverse and brake the vehicle without changing the speed of the motor or stopping the same.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1:
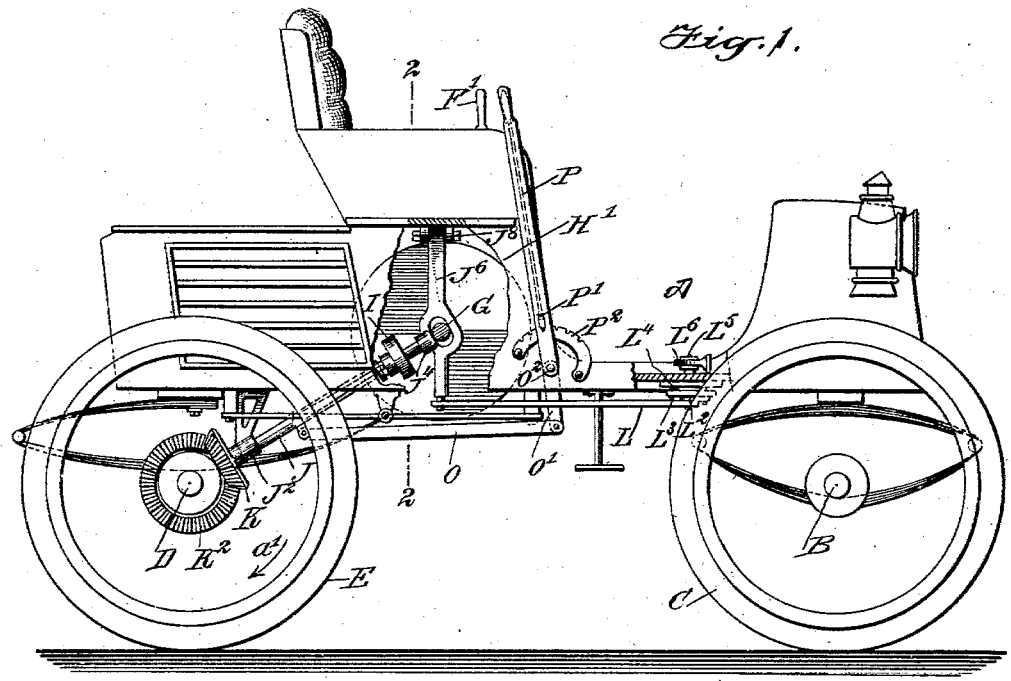
Figure 2:
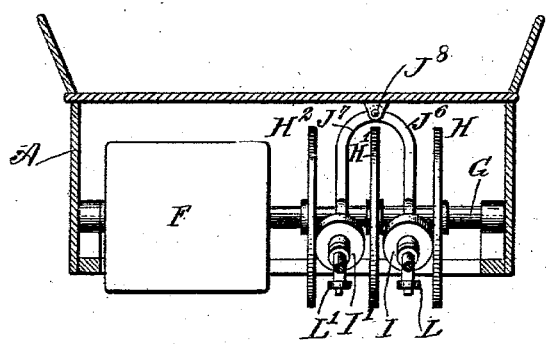

Figure 1 is a side elevation of the improvement as applied, parts being in section. Fig. 2 is a transverse section of the same on the line 2 2 of Fig. 1, and Fig. 3 is an enlarged plan view of the improvement.

The vehicle on which the improvement is applied consists, essentially, of the usual body A, a front or steering axle B, carrying front wheels C, and a rear or driving axle D, carrying rear wheels E. On the body A is mounted a suitable motor F, having its main shaft G provided with a plurality of spaced friction-disks H, H', and H², between which extend friction-pinions I and I', arranged in such a manner as to take up either an intermediate or a non-driving position—that is, to be out of contact with the said friction-disks—or said pinions may be both moved simultaneously in contact with the inner faces of the friction-disks H H² or in contact with the opposite faces of the middle friction-disk H' for reversing and braking the vehicle, as hereinafter more fully described. The friction-pinions I and I' are mounted to slide on and to rotate with shafts J and J', inclined downwardly and rearwardly and carrying at their lower ends bevel-pinions K K' in mesh with bevel gear-wheels K² K³, secured on the driving-axle D. The shafts J and J' are journaled at their lower ends in bearings J² J³, carried on the body A, and the upper ends of the said shafts are journaled in bearings J⁴ J⁵, held on arms J⁶ J⁷, fulcrumed at J⁸ on the body vehicle, preferably on the under side of the seat thereof, as plainly illustrated in Figs. 1 and 2. The lower ends of the arms J⁶ J⁷ are pivotally connected with forwardly-extending levers L L', fulcrumed on a support A', forming part of the vehicle-body A, and the forward ends of the said levers L L' are pivotally connected by links L² L³ with a crank-disk L⁴, secured on the lower end of a shaft L⁵, extending vertically and journaled in the bottom of the vehicle-body A. On the upper end of the shaft L⁵ is secured a foot-lever L⁶, adapted to be engaged at its ends by the feet of the chauffeur in charge of the vehicle to impart a swinging motion to the said lever L⁶, either with the right foot, whenever it is desired to run the vehicle forward, or with the left foot, when it is desired to reverse and brake the vehicle, it being, however, understood that when the foot-lever L⁶ is in a normal transverse position then the driving-gear is out of action—that is, the motor F may run without setting the driving-gear in motion.

The hubs of the friction-pinions I and I' are engaged by shifting collars N N', connected by links N² N³ with a cross-head N⁴, mounted to slide longitudinally on guideways on the support A', (see Fig. 3,) and the said cross-head N⁴ is pivotally connected by forwardly-extending links O with arms O', depending from a shaft O², extending transversely and journaled in suitable bearings carried on the vehicle-body A. On one end of the shaft O² is secured a speed-changing lever P, having the usual locking-catch P', adapted to engage a toothed segment P² to lock the lever P in any desired position. The lever P is under the control of the chauffeur the same as the lever L⁶ for stopping or steering the motor F. (See Fig. 1.)

The operation is as follows: When the motor is running, then the shaft G is rotated and with it the friction-disks H, H', and H². When it is desired to run the vehicle forward, the chauffeur with the right foot imparts a swinging motion to the lever L⁶ for the latter to assume the position shown in Fig. 3, and thereby the shaft L⁵ is turned, and the crank-disk L⁴ by the links L² L³ imparts a swinging motion to the levers L L' to swing the arms J⁶ J⁷ outwardly from each other to impart a like swinging motion to the shafts J J' to move the friction-pinions I I' in contact with the inner faces of the outer disks H H². Now the rotary motion of the friction-disks H H² is transmitted by the pinions I I' to the shafts J J', which by the bevel-pinions K K' impart a rotary motion to the bevel gear-wheels K² K³ to turn the driving-axle D and the wheels in the direction of the arrow a' to propel the vehicle forward. When it is desired to brake the vehicle and reverse the gear, then the chauffeur imparts a swinging motion to the foot-lever L⁶ by pressing the left foot forward, so that the links L² L³ and disk L⁴ impart a reverse swinging motion to the levers L L' and arms J⁶ J⁷ to swing the shafts J J' toward each other to move the friction-pinions I I' in frictional contact with the middle disk H'. The motion of the friction-pinions is thus reversed, and thereby act first as a brake and then to reverse the motion of the gearing to propel the vehicle in a backward direction. When it is desired to stop the gearing altogether, then the chauffeur swings the lever L⁶ into a normal or transverse position, as previously explained, so that the pinions I I' assume a non-contacting position between the disks H H' and H' H², respectively. When it is desired to change the speed of the vehicle when running in either a forward or backward direction, then the chauffeur manipulates the lever P—that is, when the lever P is thrown forward then the speed is increased and when the lever P is thrown backward the speed is decreased. When the lever P is thrown forward, it turns the shaft O², and the arms O' swing rearwardly to move the links O and cross-head N⁴ in a rearward direction, so that the cross-head pulls the links N² N³ downwardly and rearwardly and with them the pinions I I' to move the latter farther from the axis of the disks H H' H², and thereby cause the corresponding disks H H² or the disk H' to impart a faster rotary motion to the pinions I I'. When it is desired to decrease the speed, the chauffeur swings the lever P rearward to reverse the motion of the shaft O², arms O', links O, cross-head N⁴, and links N² N³ to shift the pinions I I' nearer to the axis of the disks H H' H² to cause the latter to impart a slower rotary motion to the said pinions, it being, however, expressly understood that in both cases the speed of the motor F remains the same.

The bearings J² J³ are constructed to act as fulcrums for the shafts J J' when swinging the latter on imparting a swinging motion to the arms J⁶ J⁷, as previously explained, and as the bevel-pinions K K' are secured on the shafts J J' adjacent to the said bearings J² J³ it is evident that the mesh of the pinions K K' with their gear-wheels K² K³ is not affected—that is, the said pinions and gear-wheels remain in mesh at all times.

Having thus described my invention, I claim as new and desire to secure by Letters Patent—

1. In a driving-gear for automobiles, the combination with the driving-axle of a vehicle, of a motor, spaced friction-disks on the shaft of the motor, shafts having one end geared with the driving-axle and their other ends mounted in swinging bearings, friction-pinions on the shafts and slidable thereon, means for swinging said bearings to move the shafts toward or from each other, a cross-head mounted to slide longitudinally, a connection between the cross-head and pinions, a speed-changing lever, and a connection between said lever and cross-head, as set forth.

2. A driving-gear for automobiles, comprising a driving-axle of a vehicle, driven spaced friction-disks, laterally-movable shafts geared with the said axle, friction-pinions on the shafts between the said disks, arms mounted to swing and carrying bearings for the said shafts, to shift the latter for moving the friction-pinions in or out of mesh with the friction-disks, pivoted levers having one end pivotally connected with the free end of the said arms, a manually-controlled foot-lever, and a connection between the said foot-lever and the other ends of the pivoted levers, as set forth.

3. In a driving-gear for automobiles, the combination with the rear axle, a motor, and friction-wheels on the shaft of the motor, of shafts having their forward ends mounted in swinging bearings and their rear ends geared with the axle, means for moving the shafts toward and from each other, friction-pinions mounted to turn with but to slide on said shafts, a cross-head, links connected with the cross-head and the hubs of the friction-pinions, a rock-shaft provided with arms and a hand-lever, and links connecting the cross-head with the arms of said shaft, as set forth.

4. In a driving-gear for automobiles, the combination with the rear axle, and a motor, of friction-disks mounted on the shaft of the motor, shafts having their rear ends geared to the rear axle, pivoted arms in which the forward ends of the shafts are mounted, friction-pinions on the shafts, levers pivotally connected with the free ends of the arms, a crank-disk, links connecting the levers with the crank-disk, and a foot-lever on the shaft of the crank-disk, as set forth.

5. In a driving-gear for automobiles, the combination with the rear axle, and a motor, of friction-disks on the shaft of the motor, shafts having their rear ends geared with the axle, movable bearings in which the forward ends of the shafts are mounted, friction-pinions mounted to slide on but to turn with the said shafts, means for moving the said bearings to shift the pinions in and out of contact with the disks, a sliding cross-head, links connected to the cross-head, shifting collars engaging the hubs of the pinions and with which the links are connected, a rock-shaft, links connecting the cross-head with the rock-shaft, and a lever for operating the rock-shaft, as set forth.

In testimony whereof I have signed my name to this specification in the presence of two subscribing witnesses.

EDWARD RAWSON.

Witnesses:
WM. HUNTER,
E. J. HUNTER.